US005423474A

United States Patent [19]

Kanagawa et al.

[11] Patent Number: 5,423,474

[45] Date of Patent: Jun. 13, 1995

[54] ELECTRIC WIRE JOINING METHOD

[75] Inventors: Shuichi Kanagawa; Atsushi Nakamura; Hirofumi Nishiwaki, all of Yokkaichi, Japan

[73] Assignee: Sumitomo Wiring Systems, Ltd., Japan

[21] Appl. No.: 204,780

[22] Filed: Mar. 2, 1994

[30] Foreign Application Priority Data

Mar. 4, 1993 [JP] Japan .............................. 5-071162

[51] Int. Cl.[6] .................... B23K 20/10; H01R 43/02

[52] U.S. Cl. ............................ 228/110.1; 228/136; 228/179.1; 29/866

[58] Field of Search ................ 228/110.1, 136, 179.1; 29/866

[56] References Cited

U.S. PATENT DOCUMENTS 2,567,115 9/1951 Maey ............................ 29/866 X
3,964,815 6/1976 McDonough .................. 339/97 C
4,304,454 12/1981 Yokoto et al. .................. 339/97 C
4,414,740 11/1983 Nijman ............................ 29/866 X
4,736,881 4/1988 Niebuhr .......................... 228/110.1

*Primary Examiner*—Kenneth J. Ramsey
*Attorney, Agent, or Firm*—Jordan B. Bierman; Bierman and Muserlian

[57] ABSTRACT

There is disclosed an electric wire joining method wherein, for connecting a crimp terminal (10) to electric wires (11, 12), invading projections (10*b*, 10*c*) of the crimp terminal (10) break through insulative coating portions (11*a*, 12*a*) of the electric wires (11, 12) into contact with core wire portions (11*b*, 12*b*) of the electric wires (11, 12), and the invading projections (10*b*, 10*c*) are ultrasonically welded to the core wire portions (11*b*, 12*b*) of the electric wires. The electric wire joining method necessitates no stripping process of the insulative coating portions (11*a*, 12*a*) from the electric wires (11, 12) but provides stable electrical connection.

6 Claims, 9 Drawing Sheets

ELECTRIC WIRE JOINING METHOD

BACKGROUND OF THE INVENTION

1. Field of the Invention

The present invention relates to an electric wire joining method for joining two electric wires together or joining an electric wire and a connecting terminal in an electrical wiring circuit, for example in a wiring harness, for industrial machinery and vehicles such as automotive vehicles, ships, and aircraft.

2. Description of the Prior Art

In the past, a mechanical crimping method has generally been used for joining electric wires together or joining an electric wire and a connecting terminal in a wiring harness.

For joining an electric wire 1 and an electric wire 2, for example, as shown in FIGS. 8 and 9, the electric wires 1 and 2 are stripped of their insulative coating portions 1*a* and 2*a* at the joint to expose their core wire portions 1*b* and 2*b*, respectively (coating stripping process step). The exposed core wire portions 1*b* and 2*b* are held together in an embraced manner by a crimp terminal 4 made of sheet metal such as copper or copper alloy and pressurized to be joined together by crimping (crimping process step). The electric wires 1 and 2 arc electrically connected to each other in this manner.

Likewise, for joining an electric wire and a connecting terminal, the electric wire is stripped of its insulative coating portion at one end to expose its core wire portion (coating stripping process step). The exposed core wire portion is embraced by a crimp portion of the connecting terminal made of copper or copper alloy. Pressure is applied to the joint to join the crimp portion and the core wire portion by crimping (crimping process step). The electric wire and the connecting terminal are electrically connected to each other in this manner.

However, recent pronounced increase in the number of circuits for a wiring harness has added to the complexity of the stripping of the insulative coating portion from the electric wire in the assembling step of the wiring harness, resulting in troublesome operation. In particular, it is troublesome and difficult to strip the insulative coating portion from an intermediate portion of the electric wire.

SUMMARY OF THE INVENTION

The present invention is intended for an electric wire joining method for crimping a crimp terminal to mechanically and electrically connect a plurality of electric wires to each other with the crimp terminal, each of the electric wires having a core wire portion and an insulative coating portion covering the core wire portion, the crimp terminal having a plurality of invading projections breaking through the insulative coating portions of the electric wires. According to the present invention, the method comprises the steps of: crimping the crimp terminal to connect the crimp terminal to the electric wires such that the invading projections of the crimp terminal break through the insulating coating portions of the electric wires into the core wire portions of the electric wires, respectively; and ultrasonically welding the invading projections and the core wire portions of the electric wires to each other after the crimping step.

According to the present invention, the crimp terminal is crimped and connected to the electric wires in such a manner that the invading projections of the crimp terminal break through the insulative coating portions of the electric wires into the core wire portions of the electric wires. Then the invading projections and the core wire portions of the electric wires arc ultrasonically welded to each other to provide diffusion bonding.

There is no need to strip the insulative coating portions from the electric wires, thereby to improve workability. The diffusion bonding between the invading projections and the core wire portions provides stable electrical connection.

The present invention, according to another aspect, is also intended for an electric wire joining method for crimping a crimp portion formed in a connecting terminal to mechanically and electrically connect the connecting terminal to an electric wire with the crimp portion of the connecting terminal, the electric wire having a core wire portion and an insulative coating portion covering the core wire portion, the crimp portion having an invading projection breaking through the insulative coating portion of the electric wire. According to the second aspect of the present invention, the method comprises the steps of: crimping the crimp portion to connect the crimp portion to the electric wire such that the invading projection breaks through the insulative coating portion of the electric wire into the core wire portion of the electric wire; and ultrasonically welding the invading projection and the core wire portion of the electric wire to each other after the crimping step.

According to the second aspect of the present invention, the crimp portion of the connecting terminal is crimped and connected to the electric wire in such a manner that the invading projection of the crimp portion breaks through the insulative coating portion of the electric wire into the core wire portion of the electric wire. Then the invading projection and the core wire portion of the electric wire are ultrasonically welded to each other to provide diffusion bonding.

There is no need to strip the insulative coating portion from the electric wire, to improve workability. The diffusion bonding between the invading projection and the core wire portion provides stable electrical connection.

An object of the present invention is to provide an electric wire joining method which necessitates no stripping process of an insulative coating from an electric wire and provides stable electrical connection.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
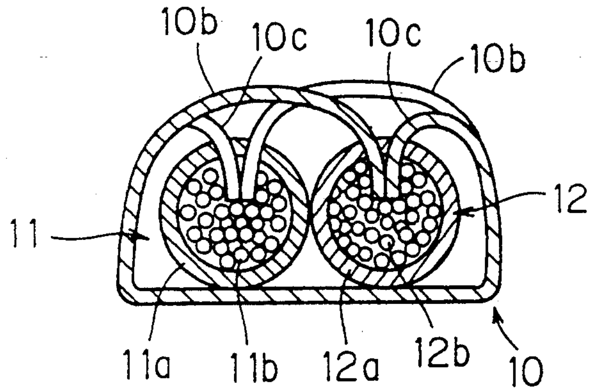
FIG. 1 is a cross-sectional view of a major part of a first preferred embodiment according to the present invention.
Figure 2:
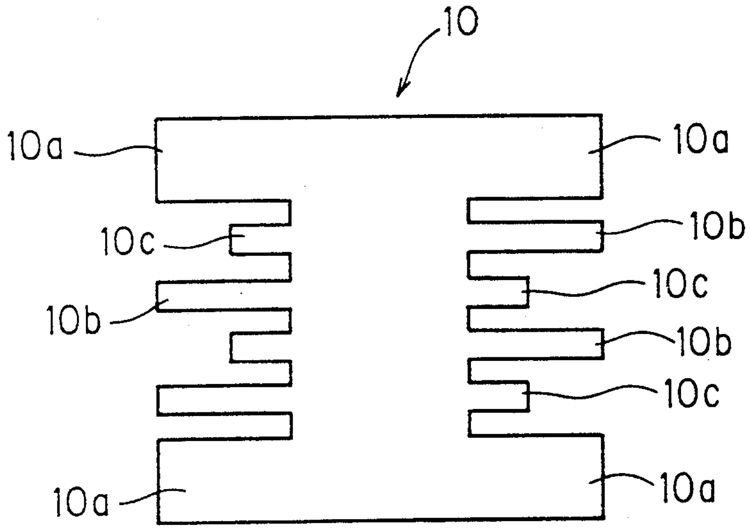
FIG. 2 is a plan view of a crimp terminal of the first preferred embodiment.

Referring to FIGS. 1 to 5, a first preferred embodiment according to the present invention will now be described. FIG. 2 is a plan view of a crimp terminal 10 made of fiat sheet metal such as copper or copper alloy. With reference to FIG. 2, the crimp terminal 10 includes pairs of crimp pieces **10*a* protruding outwardly, i.e. leftwardly and rightwardly, at its upper and lower ends. Two types of, long and short, spike-like invading projections 10*b* and 10*c* suitably spaced in the vertical direction and projecting leftwardly and rightwardly are alternately formed between the upper and lower opposite crimp pieces 10*a*. Each pair of laterally aligned invading projections 10*b* and 10*c*** are adapted so that one invading projection of each pair is long and the other invading projection is short.

Figure 3:
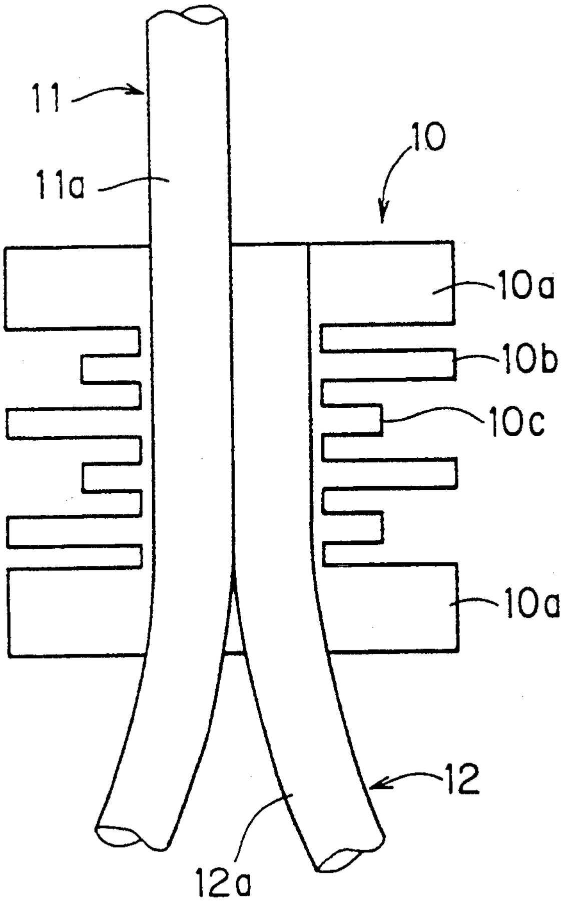
FIG. 3 illustrates a setting step of electric wires of the first preferred embodiment.
Figure 5:
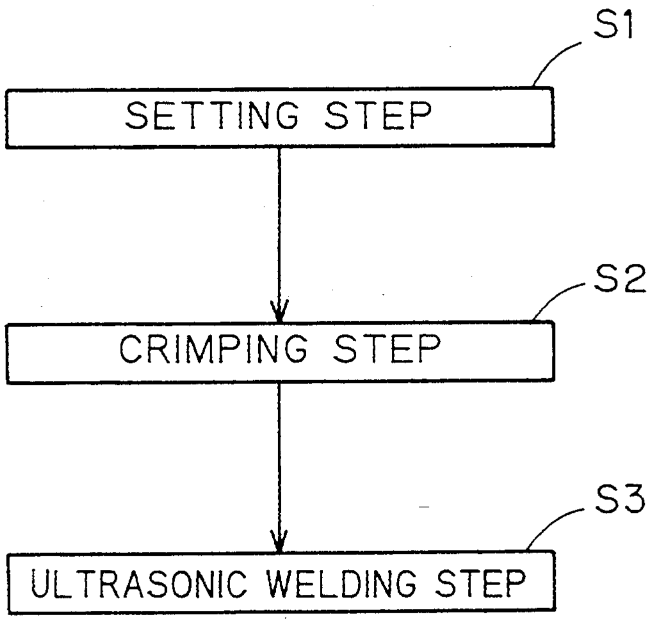
FIG. 5 is a flow chart of the processing of first and second preferred embodiments according to the present invention.

Electric wires 11 and 12 are set such that portions of the electric wires 11 and 12 to be joined are placed on the crimp terminal 10, as shown in FIG. 3 (setting step S1 shown in FIG. 5). The electric wires 11 and 12 are not stripped of their insulative coating portions **11*a* and 12*a*** when placed.

Figure 4:
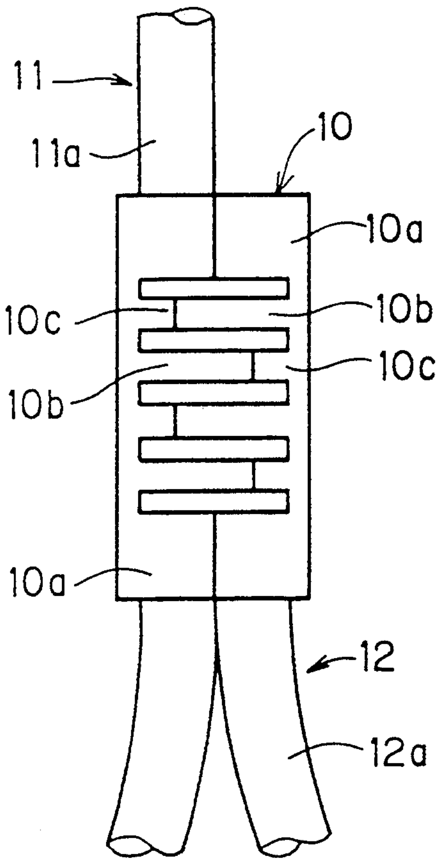
FIG. 4 illustrates the electric wires joined together of the first preferred embodiment.

In a crimping step S2 of FIG. 5, the crimp pieces **10*a*, long invading projections 10*b* , and short invading projections 10*c* of the crimp terminal 10 arc bent by the conventional mechanical crimping process. The crimp pieces 10*a* arc crimped to hold the electric wires 11 and 12 together in an embracing manner as shown in FIG. 4. Each of the long invading projections 10*b* breaks through one of the insulative coating portions 11*a* and 12*a* of the electric wires 11 and 12 which is the farther therefrom into a corresponding one of the core wire portions 11*b* and 12*b* of the electric wires 11 and 12 to contact the corresponding core wire portion. Each of the short invading projections 10*c* breaks through one of the insulative coating portions 11*a* and 12*a* of the electric wires 11 and 12 which is the closer thereto into a corresponding one of the core wire portions 11*b* and 12*b* of the electric wires 11 and 12 to contact the corresponding core wire portion. This allows electric conduction between the electric wires 11 and 12 through the crimp terminal 10**.

In an ultrasonic welding step of FIG. 5, the long and short invading projections **10*b*, 10*c* and the core wire portions 11*b*, 12*b* of the electric wires 11, 12 are ultrasonically welded to each other in the conducting state. The ultrasonic welding provides diffusion bonding between the long and short invading projections 10*b*, 10*c* and the core wire portions 11*b*, 12*b***.

Junction of the electric wires 11 and 12 provided in this manner according to the first preferred embodiment necessitates no troublesome process of stripping the insulative coating portions **11*a* and 12*a* from the electric wires 11 and 12 to improve workability. The diffusion bonding between the invading projections 10*b*, 10*c* and the core wire portions 11*b*, 12*b*** provides stable electrical connection with low contact resistance.

Figure 6:
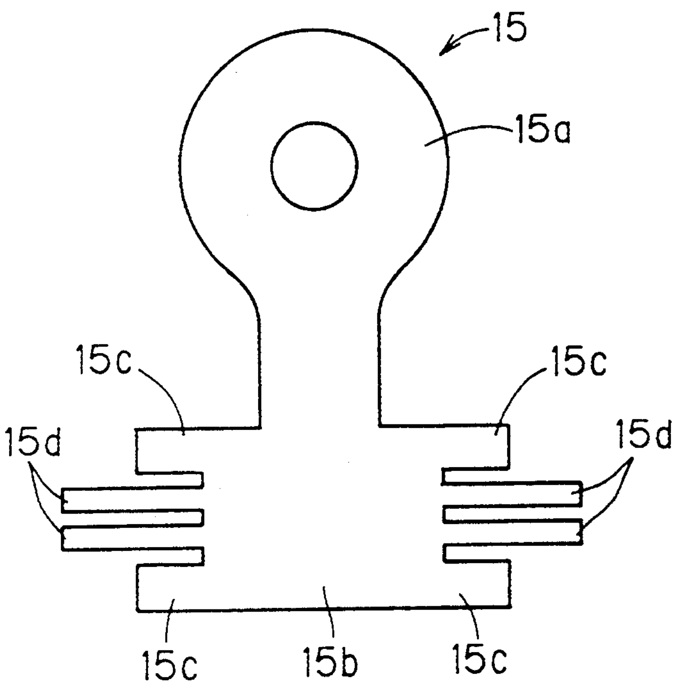
FIG. 6 is a plan view of a connecting terminal of the second preferred embodiment.
Figure 7:
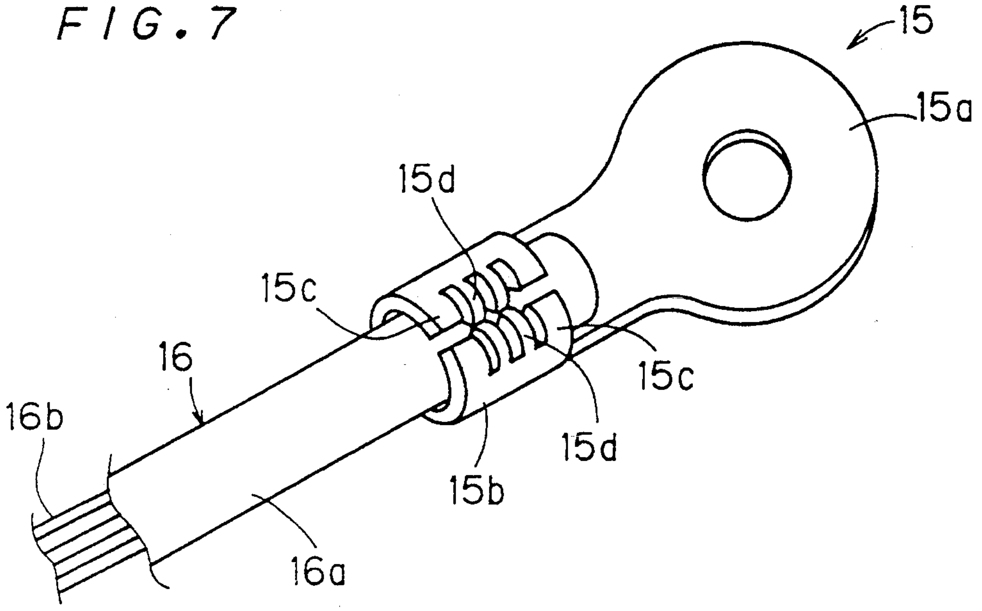
FIG. 7 is a perspective view of the connecting terminal and electric wire joined together of the second preferred embodiment.
Figure 8:
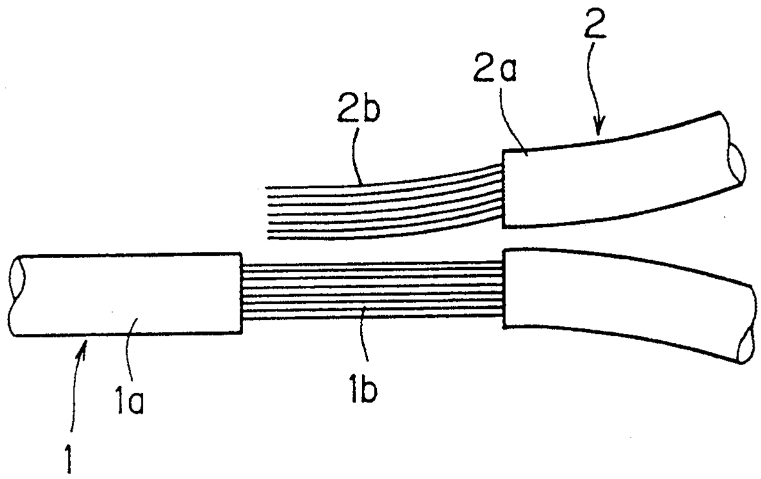
FIG. 8 illustrates a process step of electric wires of the prior art.
Figure 9:
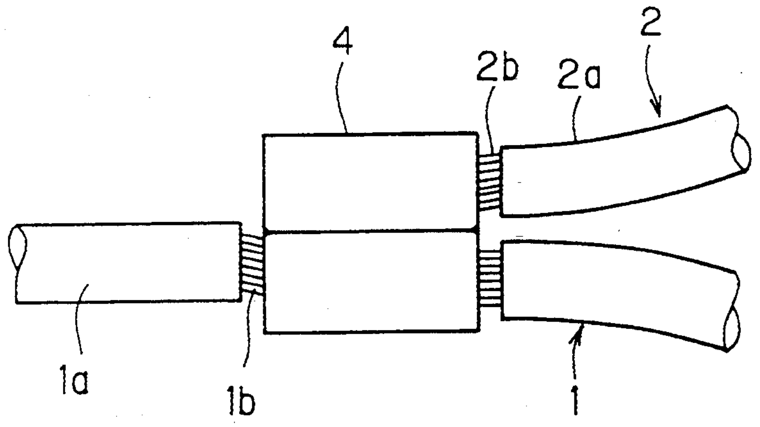
FIG. 9 is a plan view of the electric wires joined together of the prior art.

Referring to FIGS. 5 to 7, a second preferred embodiment according to the present invention will be described hereinafter. FIG. 6 is a plan view of a connecting terminal 15 made of flat sheet metal such as copper or copper alloy. The connecting terminal 15 includes a connecting portion **15*a* formed in its upper part and a crimp portion 15*b* formed in its lower part. Pairs of crimp pieces 15*c* protruding outwardly, i.e. leftwardly and rightwardly, are formed at upper and lower ends of the crimp portion 15*b*. Spike-like invading projections 15*d* projecting rightwardly and leftwardly arc formed in vertically spaced relation between the upper and lower opposite crimp pieces 15*c***.

An electric wire 16 is set such that one end of the electric wire 16 to be joined is placed on the crimp portion **15*b* of the connecting terminal 15 as shown in FIG. 7 (the setting step S1 of FIG. 5). The electric wire 16 is not stripped of its insulative coating portion 16*a*** when placed.

In the crimping step S2 of FIG. 5, the crimp pieces **15*c* and invading projections 15*d* of the crimp portion 15*b* are bent by the conventional mechanical crimping process. The crimp pieces 15*c* are crimped to hold the electric wire 16 in an embracing manner. The invading projections 15*d* break the insulative coating portion 16*a* of the electric wire 16 into a core wire portion 16*b* of the electric wire 16 to contact the core wire portion 16*b*. This allows electric conduction between the electric wire 16 and the connecting terminal 15 through the crimp portion 15*b***.

In the ultrasonic welding step S3 of FIG. 5, the invading projections **15*d* and the core wire portion 16*b* of the electric wire 16 are ultrasonically welded to each other in the conducting state to provide diffusion bonding between the invading projections 15*d* and the core wire portion 16*b***.

Junction of the electric wire 16 and the connecting terminal 15 provided in this manner according to the second preferred embodiment necessitates no troublesome process of stripping the insulative coating portion **16*a* from the electric wire 16 to improve workability. The diffusion bonding between the invading projections 15*d* and the core wire portion 16*b*** provides stable electrical connection with low contact resistance.

It should be noted that the configuration of the crimp terminal 10 and connecting terminal 15 is not limited to that of the first and second preferred embodiments but the crimp terminal 10 and connecting terminal 15 may be made in an appropriate configuration in accordance with the electric wires 11, 12 and 16 joined thereto.

While the invention has been shown and described in detail, the foregoing description is in all aspects illustrative and not restrictive. It is therefore understood that numerous modifications and variations can be devised without departing from the scope of the invention.

What is claimed is:

1. An electric wire joining method for crimping a crimp terminal to mechanically and electrically connect a plurality of electric wires to each other with the crimp terminal, each of said electric wires having a core wire portion and an insulative coating portion covering said core wire portion, said crimp terminal having a plurality of invading projections breaking through said insulative coating portions of said electric wires, said method comprising the steps of:

crimping said crimp terminal to connect said crimp terminal to said electric wires such that said invading projections of said crimp terminal break through said insulating coating portions of said electric wires into said core wire portions of said electric wires, respectively; and ultrasonically welding said invading projections and said core wire portions of said electric wires to each other after the crimping step.

2. The electric wire joining method of claim 1, wherein said crimp terminal further includes pairs of crimp pieces protruding outwardly in opposite directions at opposed ends thereof, and said invading projections arc arranged between said crimp pieces at said opposed ends and protrude outwardly, and wherein said crimp pieces are crimped to hold said electric wires together in an embracing manner when said crimp terminal is crimped and connected to said electric wires in the crimping step.

3. The electric wire joining method of claim 2, wherein said invading projections are provided in the form of a plurality of pairs of long and short invading projections protruding outwardly in opposite directions, and said long and short invading projections arc alternately arranged in spaced apart relation between said crimp pieces at said opposed ends, and wherein said long invading projections invade the core wire portion of one of said electric wires which is farther therefrom and said short invading projections invade the core wire portion of one of said electric wires which is closer thereto when said crimp terminal is crimped and connected to said electric wires in the crimping step.

4. An electric wire joining method for crimping a crimp portion formed in a connecting terminal to mechanically and electrically connect said connecting terminal to an electric wire with said crimp portion of said connecting terminal, said electric wire having a core wire portion and an insulative coating portion covering said core wire portion, said crimp portion having an invading projection breaking through said insulative coating portion of said electric wire, said method comprising the steps of:

crimping said crimp portion to connect said crimp portion to said electric wire such that said invading projection breaks through said insulative coating portion of said electric wire into said core wire portion of said electric wire; and ultrasonically welding said invading projection and said core wire portion of said electric wire to each other after the crimping step.

5. The electric wire joining method of claim 4, wherein said connecting terminal further includes a connecting portion extending from said crimp portion.

6. The electric wire joining method of claim 5, wherein said crimp portion further includes pairs of crimp pieces protruding outwardly in opposite directions at its one end adjacent said connecting portion and at the other end, and said invading projections are arranged between said crimp pieces at said opposed ends and protrude outwardly, and wherein said crimp pieces are crimped to hold said electric wire in an embracing manner when said crimp portion is crimped and connected to said electric wire in the crimping step.

* * * * *